United States Patent [19]

Daubin

[11] 4,222,701
[45] Sep. 16, 1980

[54] PUMP MODULE FOR A COMPLIANT UNDERWATER PIPE SYSTEM

[76] Inventor: Scott C. Daubin, 115 Sunrise Dr., Key Biscayne, Fla. 33149

[21] Appl. No.: 930,973

[22] Filed: Aug. 4, 1978

Related U.S. Application Data

[62] Division of Ser. No. 717,352, Aug. 24, 1976, Pat. No. 4,116,009.

[51] Int. Cl.³ .............................................. E02B 9/00
[52] U.S. Cl. .................................... 415/7; 114/144 B
[58] Field of Search ........................... 415/7, 68–69; 416/85; 417/61, 330–337; 114/144 B, 264; 115/34 C; 244/52

[56] References Cited

U.S. PATENT DOCUMENTS

| 790,906 | 5/1905 | Marks | 138/30 |
|---|---|---|---|
| 1,972,780 | 9/1934 | Laskowitz | 415/68 |
| 2,771,036 | 11/1956 | Baez | 415/69 |
| 3,148,653 | 9/1964 | Shatto et al. | 114/144 B |
| 3,191,570 | 6/1965 | Henderson | 114/144 B |
| 3,369,516 | 2/1968 | Pierce | 114/144 B |
| 3,588,796 | 6/1971 | Armistead et al. | 114/144 B |
| 3,730,126 | 5/1973 | Zunderdorp et al. | 114/144 B |
| 3,930,374 | 1/1976 | Hoppe | 114/144 B |
| 3,981,628 | 9/1976 | Carter | 415/68 X |

FOREIGN PATENT DOCUMENTS

| 552117 | 6/1932 | Fed. Rep. of Germany | 417/61 |
|---|---|---|---|
| 2410528 | 10/1974 | Fed. Rep. of Germany | 114/144 B |
| 540347 | 7/1922 | France | 415/68 |
| 815268 | 7/1937 | France | 415/68 |
| 142877 | 1/1961 | U.S.S.R. | 417/61 |

*Primary Examiner*—Everette A. Powell, Jr.

[57] ABSTRACT

A pump module adapted to be mounted on the lower end of a compliant pipe extending vertically in a sea for pumping cold water to the upper end thereof to an energy conversion device having means for eliminating torques created by the pump, means for maintaining the pump in axial alignment with the compliant pipe and means for reducing the axial stress of the pump on the compliant pipe.

5 Claims, 17 Drawing Figures

PUMP MODULE FOR A COMPLIANT UNDERWATER PIPE SYSTEM

CROSS REFERENCE TO A RELATED APPLICATION

This application is a division of my copending application Ser. No. 717,352, filed on Aug. 24, 1976, which issued as U.S. Pat. No. 4,116,009 on Aug. 26, 1978 for COMPLIANT UNDERWATER PIPE SYSTEM.

BACKGROUND OF THE INVENTION

1. Field of the Invention

This invention relates generally to underwater pumps and is more particularly directed to such pumps for pumping water vertically through a compliant pipe in an energy conversion system.

2. Description Of The Prior Art

As indicated in my copending application Ser. No. 717,352, the conventional system utilized rigid pipes. Upon the use of present compliant pipe, problems of torques, of horizontal movements of the compliant pipe and of axial stress came into being and which wire resolved in the compliant pipe system by providing the present pump module.

SUMMARY OF THE INVENTION

Therefore, a principal object of the present invention is to provide a compliant underwater pipe system for the conversion of water temperature to useable enerby with a module pump having counter rotating screws or blades, radial diverters and symmetrically disposed jet pods for eliminating torques created by the pump.

Another object of the present invention is to provide a compliant underwater pipe extending from the surface of ocean to the lower areas with a module pump mounted at the lowermost end of the compliant pipe wherein the pump is maintained in axial juxtaposition with the compliant pipe and the horizontal movement of the module pipe reduced to a minimum.

A still further object of the present invention is to provide an underwater pipe system described as above with a module pump having an adjustable and minimal axial stress effect on the compliant pipe.

With these and other objects in view, the invention will be best understood from a consideration of the following detailed description taken in connection with the accompanying drawings forming a part of this specification, with the understanding, however, that the invention is not confined to any strict conformity with the showing of the draiwngs but may be changed or modified so long as such changes or modifications mark no material departure from the salient features of the invention as expressed in the appended claims.

DESCRIPTION OF THE PREFERRED EMBODIMENTS

Figure 1:
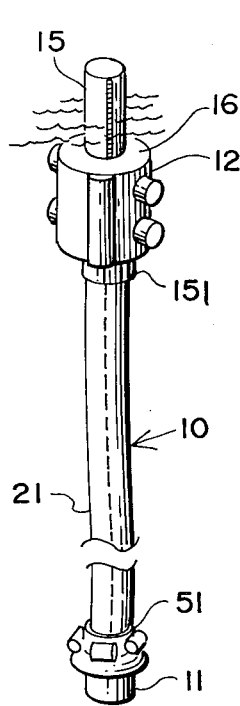
FIGS. 1-3 inclusive are perspective views of my compliant water pipe shown vertically in an ocean with a pump modical mounted at the lower end thereof and a floating energy producing plant mounted at the upper end.
Figure 2:
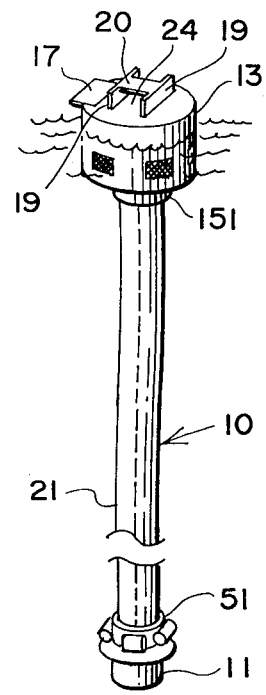
Figure 3:
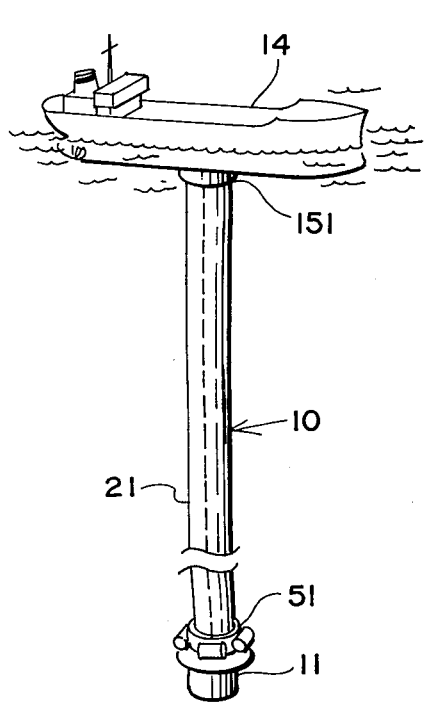

Referring to the drawings wherein like numerals are used to designate similar parts throughout the several views, and in particular to FIGS. 1-5 inclusive, the numeral 10 refers to a compliant pipe system constructed in accordance with my invention shown consisting of a compliant pipe 21 extending vertically in an ocean with my pump module 11 connected to the lower end portion thereof and a floating energy conversion plant 12 mounted on the upper end portion thereof. In FIG. 1, the energy conversion plant 12 is floating but but partially submerged, in FIG. 2 the plant 13 is floating on the surface while in FIG. 3 the plant 14 consits of a ship or the like having a conventional energy conversion plant contained therein.

The energy conversion plants 12, 13 and 14 constitute a part of the overall system for utilizing a difference in temperature of water to produce energy, but are conventional and do not form a part of applicant's invention separate from the system. Applicant's invention consists essentially of the construction and use of the compliant pipe 21 and variations thereof as is explained in detail hereinafter and the novel pump module 11 for pumping cold water to the water surface energy conversion plants 12, 13 and 14 utilizing one of the well known systems for producing useful energy by utilizing the difference in temperatures of the water.

All of the enrgy conversion plants 12, 13 and 14 are provided with access to the inside thereof for the operation, maintenance and repair of the equipment contained therein. In FIG. 1, the partially submerged plant 12 is provided with a tubular member 15 extending above a hatch covered opening (not shown) in the top surface 16 of the plant 12 with appropriate ladders attached to the outside and inside wall of the member 15 for those wanting to enter the power plant 12. The floating plant 13 is provided with a heli-pad 17 mounted on the top surface 18 for the transporting of persons by helicopter to and from the plant 13. There are also vertically disposed posts 19 joined by horizontal support members 20 and a hatch covered opening in the top wall 18 for the movement of heavy equipment into and out of the plant 13. Plants 12, 13 and 14 are provided with energy conversion systems (not shown).

The compliant underwater pipe 21 may be fabricated from one or more of a number of different materials. The most appropriate materials fall within the general class known as "elastomers" or "fiber reinforced elastomers". Properties sought are lightness in weight, toughness, durability, strength, compliance and electrochemical inertness. Desired mechanical properties are somewhat anisotropic. Generally in the circumferential direction high tensile strength and high modulus of elasticity are appropriate, while in the longitudinal direction moderate tensile strength and low modulus of elasticity are appropriate.

The pipe material may be homogeneous or compound filamental, i.e. a combination of homogeneous material matrix into which high strength filaments are imbedded.

Particular homogeneous materials from which the compliant underwater pipe may be fabricated include polyurethane, polyethylene, natural rubber, neoprene, buna-N and others. Filamental materials which may be used to add strength and toughness in a compound material include nylon, dacron, polypropylene, Kevlar, glass fiber and others.

Figure 5:
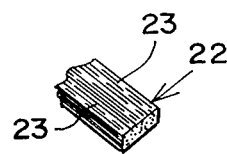
FIG. 5 is a fragmentary perspective view of a single strip of material used to fabricate the compliant water pipe.
Figure 4:
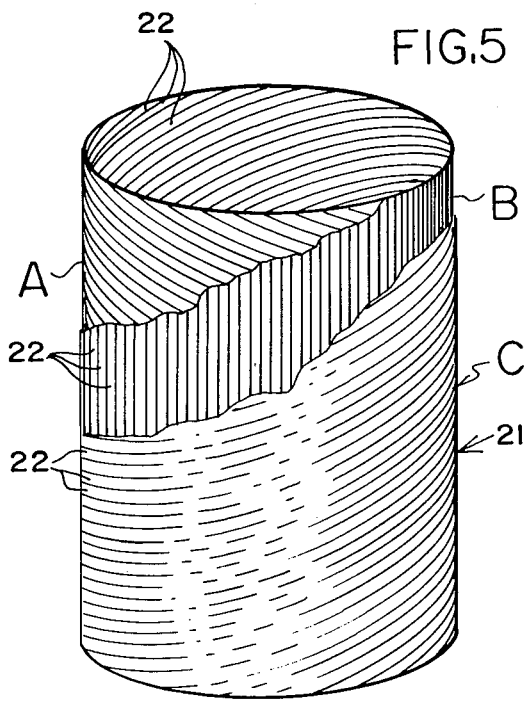
FIG. 4 is a perspective view of my compliant water pipe partially broken away to show the sandwich construction thereof.
Figure 12:
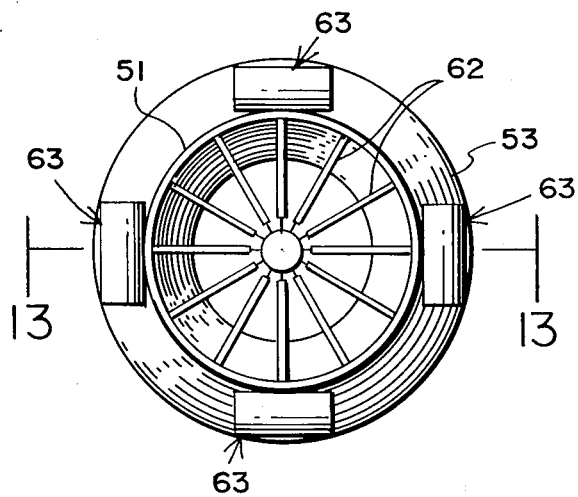
FIG. 12 is a top view of the pump module.
Figure 14:
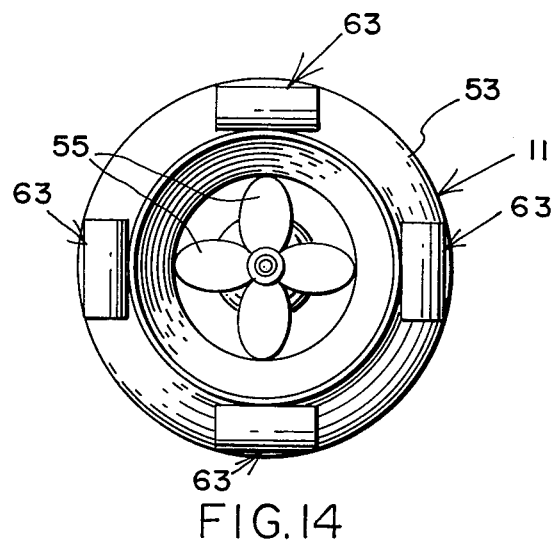
FIG. 14 is a cross sectional view taken along the line 14—14 of FIG. 13.
Figure 13:
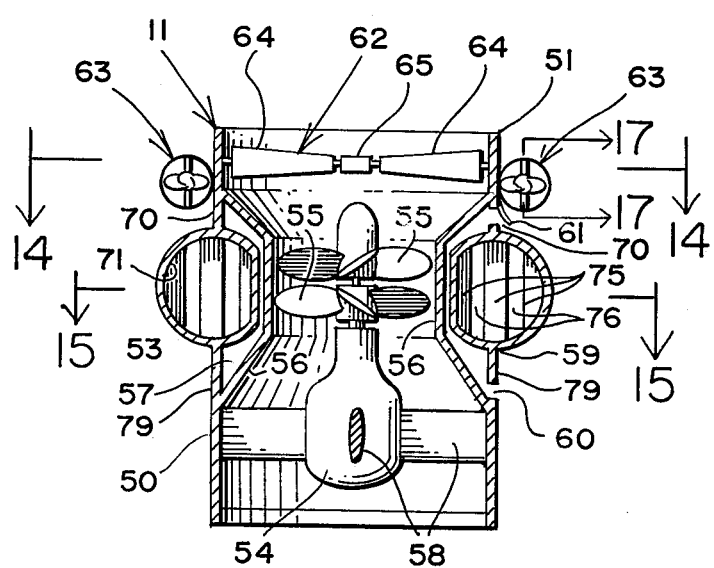
FIG. 13 is a cross sectional view taken along the line 13—13 of FIG. 12.
Figure 17:
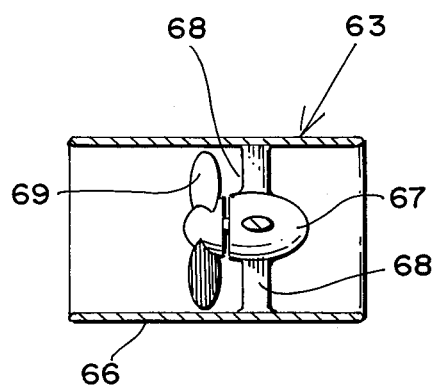
FIG. 17 is a cross sectional view taken along the line 17—17 of FIG. 13.
Figure 15:
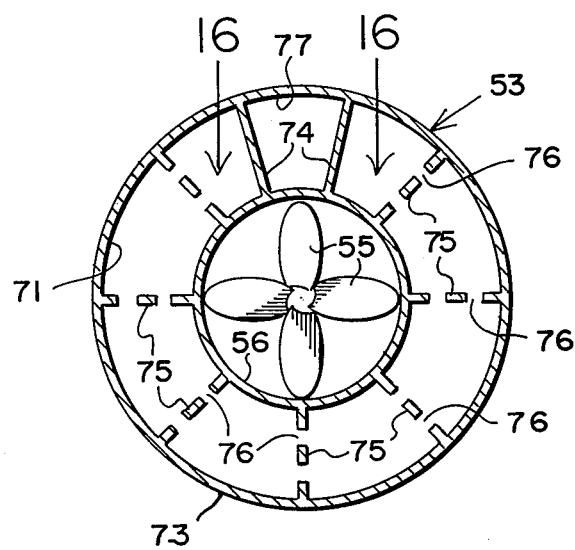
FIG. 15 is a cross sectional view taken along the line 15—15 of FIG. 13.

FIGS. 4 and 5 show an example of the material construction of a compound compliant underwater pipe 21 which consists of strips of elastomer material 22 such as polyurethane for example, into which high strength filaments or strands 23 such as nylon or Kevlar for example, have been imbedded. The strips 22 are laid in multi-directional "sandwich". The bottom and top of the "sandwich" consist of tight helices -A- and -C-, spiralling in opposite directions, which provide the high circumferential tensile strength and high modulus of elasticity. Most likely these strips 22 would contain a high strength, high elastic modulus filament such as Kevlar. Between the helices -A- and -C- parallel strips -B- are laid axially. Most likely, these strips 22 would contain a moderate strength, low elastic modulus filament 23 such as nylon, or strands of filament twisted to provide the required strength and low modulus. Thus, the assembled compliant underwater pipe would possess the required strength both axially and circumferentially and would possess an effectively low axial modulus of elasticity and a high circumferential modulus of elasticity. The tubes or sheaths of the compliant underwater pipe 10 may be fabricated from as many as three layer "sandwiches", as shown in FIG. 4, as is required to provide the strength required of the compliant water pipe system 10.

Figure 6:
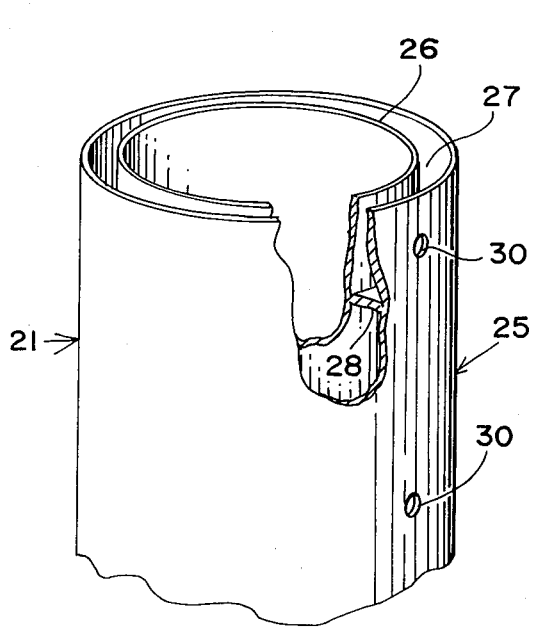
FIG. 6 is a perspective view partially broken away of my compliant waterpipe.
Figure 7:
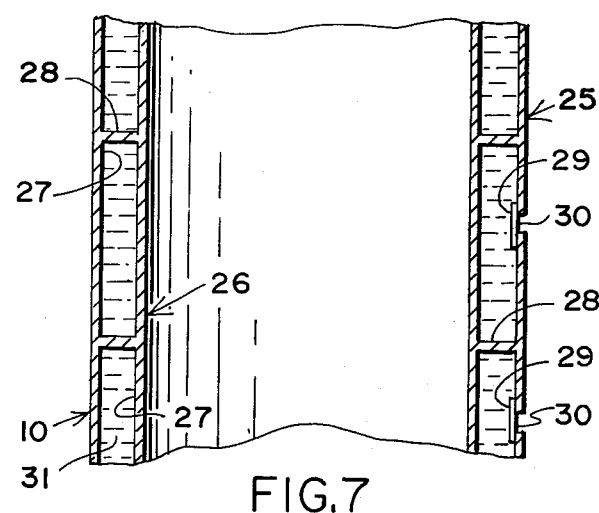
FIG. 7 is a longitudinal cross sectional view thereof.

My compliant water pipe system 10 consists of a plurality of coaxially disposed compliant pipes of substantially identicla construction, except as to a diameter. As shown by FIGS. 6 and 7 one embodiment of my compliant water pipe system 10 consists of a pair of coaxially disposed pipes 25 and 26 of identical structure as that of the above described pipe 21, the pipe 25 having a larger diameter than that of the pipe 26 whereby a space 27 is formed therebetween. The space 27 between the pipes 25 and 26 is divided into a series of vertically disposed chambers, sealed from each other by means of horizontal wall portions 28. A flap valve 29 mounted over an opening 30 in the pipe 25 permits the filling as well as the emptying of the individual chambers 27 with a fluid 31 that will act as a buoyancy and insulation agent. It is obvious to a person versed in the art that by selecting a fluid of proper specific gravity, the desired buoyancy of my compliant underwater pipe system may be attained ranging from positive buoyancy to negative buoyancy including neutral buoyancy, whereby little or no weight will have to be supported by the power plants 12, 13 and 14.

Figure 8:
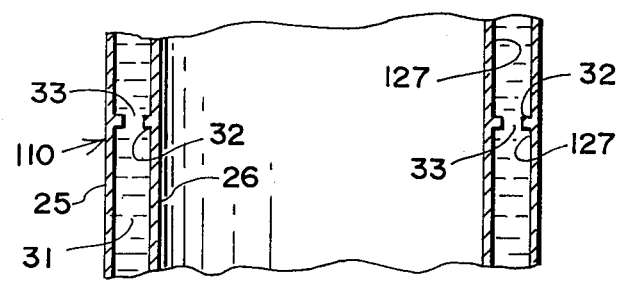
FIG. 8 is a similar view of an alternate construction of my compliant water pipe.

In the event it is desired that the liquid 31 filling the space between pipes 25 and 26 be utilized only for insulation purposes and not to affect the buoyancy of the compliant water systems 10, the pipe systems 110 as shown by FIG. 8 is utilized. As in FIG. 7, the coaxial pipes 25 and 26 form a plurality of vertically disposed chambers 127 separated from each other by a horizontally disposed circumferential wall 32 that extends between the pipes 25 and 26. However, the walls 32 are provided with a plurality of openings 33 to permit cold water that is being pumped by the modular pump 11 through the pipe 26 and the chambers 127 to flow along the full length of the pipes 25 and 26. In this alternate construction of my cold water pipe system 110, the latter receives little or no buoyancy effect therefrom, but a more effient insulation is effected than that shown by FIGS. 6 and 7.

In the pliable underwater pipe system 10 as shown by FIGS. 6 and 7 the buoyancy fluid 31 also acts as insulation wile that shown by FIG. 8 utilizes the sea water for insulation purposes only. The alternate constructions of my cold water pipe system 210 and 310 shown by FIGS. 9, 10 and 11 provide separate chambers for fluids each of which produces buoyancy and insulation effects respectively.

Figure 9:
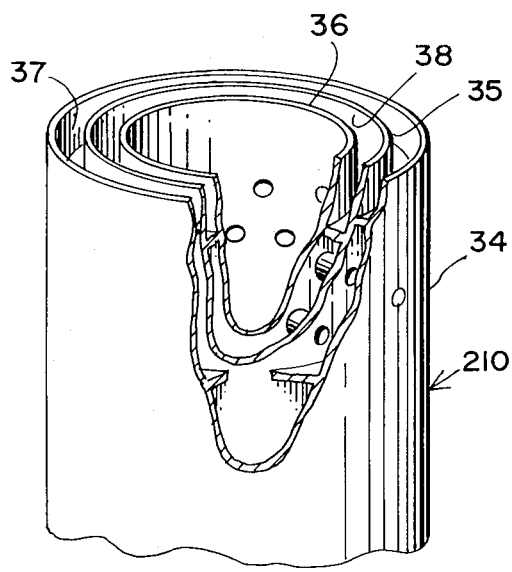
FIG. 9 is a view similar to FIG. 6 of a further alternate construction of my compliant water pipe.
Figure 10:
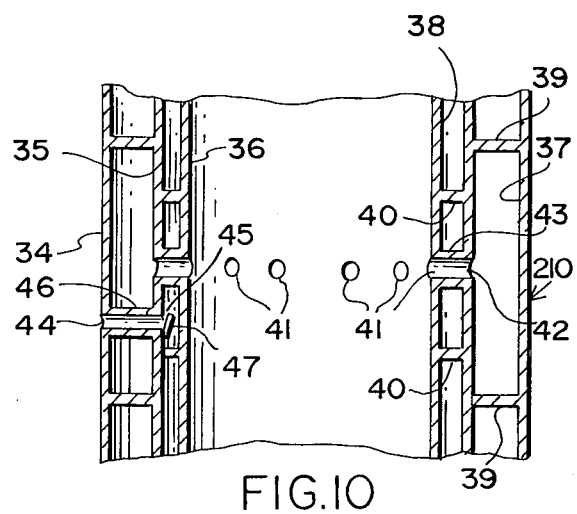
FIG. 10 is a longitudinal cross sectional view thereof.

Referring now to FIGS. 9 and 10, there is shown a plurality of coaxially mounted compliant pipes 34, 35 and 36 of such diameters as to provide a space 37 between the pipes 34 and 35 and a space 38 between the compliant pipes 35 and 36. Both of the spaces 37 and 38 are divided into vertically disposed separated chambers by horizontal wall member 39 and 40, respectively. The chambers 37 communicate with water flowing through the pipe 36 by means of openings 41 in the pipe 36 and openings 42 in the pipe 35, the openings 41 and 42 being joined by a tubular member 43 to permit water that is being pumped through the pipe 36 to fill the chambers 37 to thereby insulate the water flowing through the pipe 36 against changes in temperature as it flow upwardly to the power plants 12, 13 and 14.

The chambers 38 are filled with buoyancy fluids by means of openings 44 and 45 formed in the compliant pipes 34 and 35 respectively, the openings 44 and 45 being joined by a tubular member 46. At the inner surface of the pipe 35 is a flap valve 47 that operates as a check valve to the filling and evacuating of the chambers 38 of buoyant fluids. From the above construction it can be seen that upon actuation of the modular pump 11, large quantities of water will flow upwardly through the pipe 36 with the chambers 37 becoming filled with insulating water. The chambers 38 would be previously filled with buoyancy fluid that will render the compliant pipe system 210 at any desired degree of positive or negative buoyancy.

Figure 11:
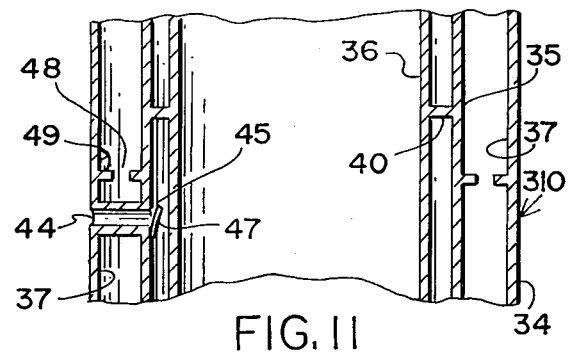
FIG. 11 is a similar view of a still further alternate construction of my compliant waterpipe.

The alternate construction 310 shown by FIG. 11 is identical in function to that shown by FIGS. 9 and 10 except that the insulating water flows directly upwardly in the insulating chambers 37 from the pump module 11 by means of openings 48 formed in the horizontal wall members 49.

As stated hereinabove all of my compliant pipe systems 10, 110, 210, and 310 are provided with the pump module 11 that is fastened to the lower end of the comliant pipe by a mating ring 51 mounted at the top portion of a cylindrical housing 50, the latter being of approximately the same diameter as that of the compliant pipes 26 and 36. A like mating ring 151 secures the top end portion of the compliant pipes to the energy conversion plants 12, 13 and 14.

The function of pump module 11 is to increase the pressure, at a high rate of flow, of the cold water within the central volume of compliant underwater pipe 21. Because compliant underwater pipe 21 has neither flexural nor torsional rigidly, it is required that pump module 11 have the concurrent capability to control and eliminate any residual torque about its longitudinal axis and to provide a means of translating its position in the horizontal plane. It is also desirable that pump module 11 possess a means to control the axial stress in compliant underwater pipe 21. Further, the operations of deployment and retrieval of compliant underwater pipe 21 are facilitated by the ability of pump module 11 to achieve either a surfaced or a submerged condition. The required torque control is achieved through a multiplicity of systems. Major torques are eliminated through the use of counter rotating screws 55; residual torques are controlled and eliminated through employment of either radial diverters 62, jet pods 63, or both in combination. Translation in the horizontal plane is effected through the proper combination of thrusts developed in jet pods 63. Axial stress in compliant underwater pipe 21 is controlled through adjustment of the net buoyancy of pump module 11 by means of flooding or dewatering auxiliary ballast tank 53. Submerging or surfacing of pump module 11 is effected through flooding or dewatering main ballast chamber 57. A detailed description of these various sub-systems of pump module 11 is presented in the paragraphs below.

In operation it is required that the pump module 11 remain approximately directly below the position of the surface energy conversion plants 12, 13 and 14. The compliant water pipes 25, 26, 34, 35 and 36 rely on the internal pressurization created by the water being pumped by the pump module 11 and flowing upwardly to the energy conversion plants 12, 13 and 14 to inflate the pipes and allow them to conduct the fluid. It is required that there be no twists in the compliant water pipes in order that the system operate efficiently. The relative azmuthial orientation and translational position in the horizontal plane between the pump module 11 and the cold water header of the surface energy conversion plants must remain fixed or at least limited within narrowly specified tolerances. As is explained in detail hereinafter, my pump module 11 achieves both fixed relative azmuthial orientation and translational position. Mounted in the lower portion of the housing 50 is a double armature electric motor 54 which drives a pair of counter rotating screws 55 positioned at approximately the mid-portion of the housing. The axially positioned motor 54 is secured by flared cross members 58 extending from the motor 54 to the housing 50.

The cylindrical housing 50 forms peripheral main ballast chambers 57 by means of an inwardly extending wall portion 56 positioned at approximately the center portion of the housing 50. The main ballast chamber 57 is maintained at a pressure approximately equal to the surrounding water pressure, thus permitting a relatively light structural construction of the tank walls 79, 70 and 56. A doughnut shaped auxiliary ballast tank 53 is mounted in the peripheral opening 59 formed in the housing 50 with the walls 79 and 70 extending from the tank 53 to the cylinder walls of the housing 50 to seal the ballast chamber 57. A permanent opening 60 is positioned at the lower portion of the wall 79 of the main ballast chamber 50 to permit water to enter and leave the chamber 57 while a valved vent 61 is positioned at the upper portion of the wall 70 of the chamber 57 to vent the chamber 57 as water is made to enter or to seal the chamber 57 as water is made to leave the main ballast chamber 57.

The function of the main ballast chamber 57 is to provide a reserve buoyancy margin when the pump module 11 is on the surface of the water, that is, while in transit to the site of operation, at which time the ballast chamber is dry. When the pump module 11 is submerged, the ballast chamber 57 will be completely flooded.

By use of counter rotating screws 55, the net torque produced by the pump 54 is reduced to a value close to zero. However, due to imbalances and lack of perfect axial symmetry a residual torque about the main pump 54 is to be expected. Such residual torque is balanced by either or both of radial diverters 62 and jet pods 63 mounted at the upper portion of the housing 50.

The radial diverters 62 consist of a plurality of radially disposed vanes 64 each having its inner end pivotally mounted to a center hub portion 65 with the outer ends pivotally secured to the housing 50. It can be readily noted that upon concerted pivotal movement of the vanes 64, the impact of water flowing therealong will effect a rotational movement of the housing 50 in the desired direction. Consequently if any of my compliant water pipes described above should become twisted, pivotal movement of the vanes 64 can cause the housing 50 and the pipe to which it is attached to untwist itself readily.

In addition thereto, there is mounted about the top outer portion of the housing 50 a plurality of jet pods 63 capable of rotating the housing 50 as well causing translatory movement thereof. Each jet pod 63 consists of a tubular member 66 fastened to the housing 50 in which a reversible motor 67 is axially positioned by cross braces 68. Screws 69 actuated by the motor 68, force water through the tubular member 66 to create reactive forces that will, when combined with the reactive forces of the other jet pods 63, compel the pump module 11 to rotate about its axis or move in any desired direction. By actuating the jet pod motors 67 to rotate in the same direction, the effect thereby created will cause the pump module 11 to rotate about its axis. If it is desired to effect a translatory movement of the pump module 11, a pair of opposing jet pod motors 67 can be actuated to operate in approximately the same compass direction, so that the thrusts caused thereby is in the same desired general direction.

The doughnut shaped auxiliary ballast tank 53 is provided with means for receiving and discharging water in order to adjust the net buoyancy of the pump module 11 so that it may counteract part of the reactive thrust of the rotating screws 55 and thus apply the desired axial load to the compliant water pipes 10, 110, 210 and 310. This buoyancy control is also necessary for submerging and surfacing the pump module 11 during deployment and retrieval operations. To permit this variation of the amount of ballast water contained within the toroidal auxiliary ballast tank 53, it is necessary that the structure of the pressure hull 73 of the tank be of such strength to withstand the static pressure of the sea when the tank 53 is dry and the pump module 11 submerged at its normal operating depth. By proper design the range of attainable buoyancy of the pump module 11 varies from several thousand pounds negative (pump module heavy) to several thousand pounds positive (pump module light) and specifically includes zero (pump module neutrally buoyant).

The chamber 71 within the toroidal auxiliary ballast tank 53 is internally subdivided by radial internal bulkheads 74 and 75. Bulkheads 75 are for the purpose of the reduction of free surface; they are penetrated by holes 76 to permit the passage of water through them. Bulkheads 74 form the walls of the pump room 77; these bulkheads are watertight, pressure resistant bulkheads designed to maintain pump room 77 in a dry condition.

Figure 16:
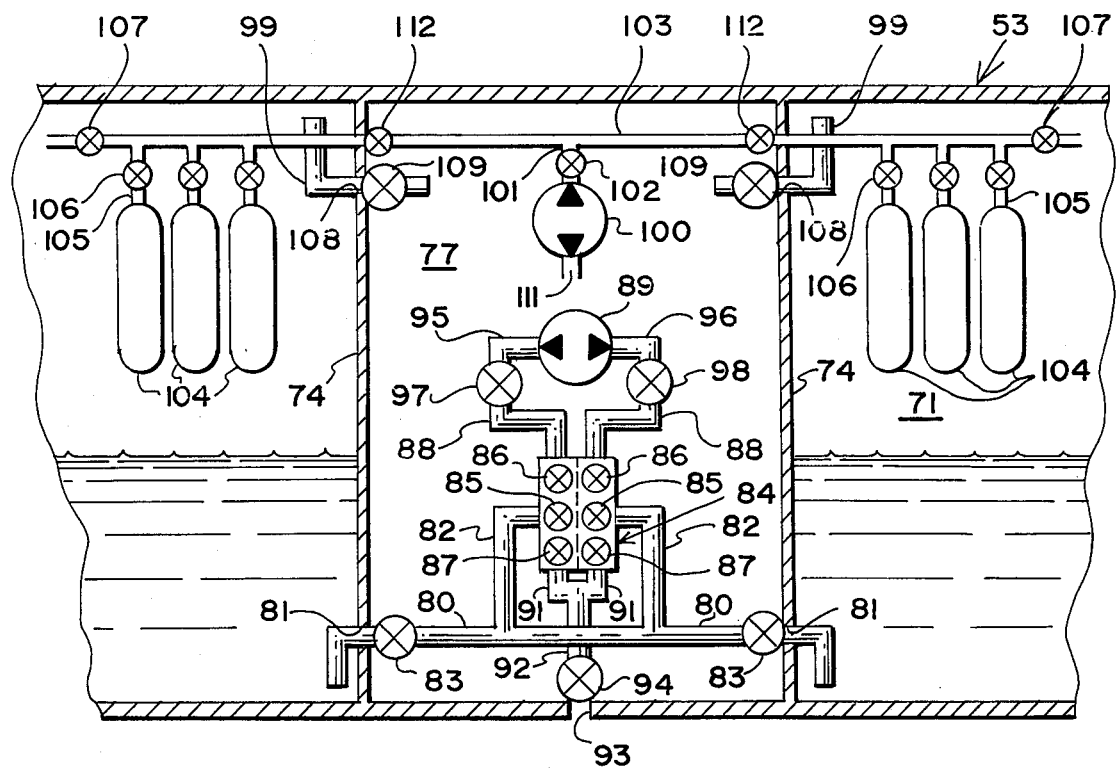
FIG. 16 is a fragmentary cross sectional view taken along the line 16—16 of FIG. 15.

The pump and piping system which is found in the pump room 77 consists of a manifold 84 having three pairs of valves 85, 86 and 87 with the left side of the manifold 84 as seen in FIG. 16 being the suction side while the right side being the discharge side thereof. Connecting pipes 80 extend to an opening 81 in the bulkheads 74 with a valve 83 mounted in each of the pipes 80 to control the flow of water therethrough. Pipes 80 are connected to pipes 82 that extend to the manifold and communicate with the valves 85. Valves 86 communicate with pipes 88 that extend to the inlet and outlet respectively of a trim pump 89. Valves 97 and 98 are interposed in the pipe lines 88. The valves 87 are connected to pipe lines 91 that communicate with the pipe line 92; the latter extending to an opening 93 in the hull of the auxiliary ballast tank 53. A valve 94 is mounted on the pipe 92 to control the flow of water from and into the ocean or sea. It is to be noted that all of the valves and pumps described herein are remotely controlled by conventional devices, and therefore are not described in detail herein.

When it is desired to allow sea water to enter the buoyancy tank 53, to increase the total weight of the system and decrease its net buoyancy, valve 94 is opened and water is permitted to enter through the opening 93 through pipes 92, 91 to both valves 87. Valves 85 which communicate with valves 87 permit the water to flow through the pipes 82 to the pipes 80, past the open valves 83 through the ports 81 and into the ballast chamber 71 until the desired amount of water is contained therein when manifold valves 85 and 87 are closed. It is not necessary to operate the trim pump 89 during this phase of the operation since the ambient sea pressure exceeds the air pressure in the tank compartments 71 of the ballast tank 53.

To lessen the weight of the system and increase its net buoyancy, the water contained in the buoyancy tank 53 must be pumped from the tank and into the sea. The trim pump 89 is energized to compel sea water to flow from the chamber 71, past the open valves 83, through the pipes 80, 82 to the valve 85 on the suction side of the manifold 84. The water then flows out of the suction side of the manifold 84 through the valve 86, through the pipe 88 past valve 97 to suction line 95, to enter the pump 89 on its left or suction side to be discharged through the discharge line 96 or right side of the pump 89. Water under pressure then flows past open valve 98 into pipe line 88 and then to the valve 86 on the discharge side of the manifold 84. The valve 86 communicates with the valve 87 on the discharge side of the manifold 84 to cause the water to flow through pipes 91 and 92, past the open valve 94 and be discharged into the sea.

There is provided within the ballast tank 53 an air system whose function is two-fold. The first function is to permit water to flow into the ballast tank 53 naturally when the proper valves are opened since the ambient sea pressure is higher than the air pressure maintained by the air system within the ballast tank 53. If there were no means of reducing air pressure in the ballast tank 53 as it is being filled with sea water, eventually the air pressure would equal the sea pressure prior to the ballast tank being filled with water and no more filling could take place. The second function of the air system is to provide in the case of an emergency or when otherwise required, additional air back pressure within the ballast tank 53 to assist the trim pump 89 in discharging water into the sea. In addition, in the event of the trim pump 89 becoming disabled, the water can be discharged from the ballast tank 53 by means of the air system alone as explained hereinafter.

Mounted in the pump room 77 is a high pressure air compressor 100 connected by a pipe 101 in which there is a valve 102 that controls the flow of air to a pipe 103 that extends throughout the entire chamber 71 of the auxiliary ballast tank 53. In chamber 71 there is a plurality of air storage flasks 104 connected by pipes 105 to the pipe line 103. A valve 106 is mounted in each of the connector pipes 105. The atmosphere in the pump room 77 communicates with that in the adjacent compartments by means of an opening 108 at the top portion of the bulkhead 74 controlled by a valve 109. Connected to the opening 108 is a pipe 99 that extends towards the top portion of the chamber 71. The compartments formed by pairs of radial bulkheads 75 are mutually interconnected by the openings 76 in the bulkheads 75 and connected to the atmosphere of the pump room 77 by means of the vent lines 99 and their associated bulkhead stop valves 109.

When it is desired to reduce the air pressure within the chamber 71 of the toroidal ballast tank 53, the air compressor 100 is actuated. Air enters the compressor 100 via the inlet 111, is discharged through the outlest 101, pipe 103 and bulkhead stop valves 112 at a pressure that is just above the pressure within the air flasks 104. When the air pressure in the chamber 77 of the ballast tank 53 has been sufficiently reduced the air compressor 10 is deenergized and the stop valve 102 is closed.

When it is desired to increase the air pressure in the chamber 71 of the ballast tank 53 in order to discharge water from the ballast tank 53 in order to retrieve the device from the sea, for example, all that need be done is open the valves 106 and 107 to permit air to escape from the air flasks 104 into the chamber 71.

The above description of my compliant underwater pipe system taken in connection with the drawings shows that my system for use as an energy conversion device is not only feasible but most economical in costs of manufacture and operation. It is not "too heavy, too awkward" as is attributed to rigid pipe systems. My compliant underwater water pipes 21, 210, 310 are readily handled by folding same and rolling them on drums to the site of use where the pump module is attached and the assembly put over the side. During this time the buoyancy spaces between the concentric cylindrical walls are filled with a liquid lighter than water to lessen the static weight of the combined pipe and pump module 11. After the desired depth has been reached by the pump module 11, the upper end of the compliant pipe is connected to the desired energy conversion device. Now by remote control the motor 54 of the screws 55 is energized to commence pumping the cold water to the energy conversion device. The dynamic forces being imposed on the system is then neutralized, as explained hereinabove, upon operation of the buoyancy tanks system and the jet pods 67. The upward flow of water in the compliant water pipe will billow out the pipes so as to stand erect in the water, and the buoyancy liquid will reduce the amount of weight to be supported by the energy conversion device to any desired degree while the appropriate operation of the pump module will prevent the twisting of the compliant pipe as well as correcting for any dynamic forces being imposed on the system by the flow of water therealong.

It is to be noted that all of the valves and other equipment that are operation, are actuated by remote control wiht the use of conventional remote control equipment, and therefore has not been described herein.

What I claim as new and desire to secure by Letters Patent of the United States is:

1. A pump module for a compliant underwater pipe system comprising a housing having an inlet and an outlet, a pump mounted in said housing for pumping fluid through said housing from said inlet to said outlet, torque and horizontal translation control means secured to said housing for controlling torques and movement of said housing effected by said pump, further torque control means secured to said housing for controlling residual torques created by said pump, means for connecting said housing to a compliant water pipe in substantial axial alignment thereto and buoyancy control means for controlling the axial stress of said pump module on said compliant pipe.

2. The structure as recited by claim 1 wherein said torque control means comprises a plurality of counter rotating screws mounted on said pump and a plurality of substantially adjustable and radially extending vanes mounted in proximity of said outlet.

3. The structure as recited by claim 2 wherein said further torque control means and said horizontal translation control means comprises a plurality of jet pod means mounted substantially symmetrically about said housing.

4. The structure as recited by claim 1 wherein said buoyancy control means comprising tank means mounted about said pump module, a plurality of walls mounted in said tank means forming a pump chamber and water containing chamber, pump means mounted in said pump room for pumping water out of said water containing chamber, a plurality of compressed air flasks, further pump means connected to said compressed air flasks for maintaining a desired air pressure in said water containing chamber for controlling the buoyancy of said pump module.

5. The structure as recited by claim 3 wherein said buoyancy control means comprising tank means mounted about said pump module, a plurality of walls mounted in said tank means forming a pump chamber and water containing chamber, pump means mounted in said pump room for pumping water out of said water containing chamber, a plurality of compressed air flasks, further pump means connected to said compressed air flasks for maintaining a desired air pressure in said water containing chamber for controlling the buoyancy of said pump module.

* * * * *